(12) United States Patent
Hammarström

(10) Patent No.: US 11,038,332 B2
(45) Date of Patent: *Jun. 15, 2021

(54) WEDGE FOR A LEAD-THROUGH SYSTEM

(71) Applicant: Roxtec AB, Karlskrona (SE)

(72) Inventor: Pär Hammarström, Nättraby (SE)

(73) Assignee: Roxtec AB, Karlskrona (SE)

( * ) Notice: Subject to any disclaimer, the term of this patent is extended or adjusted under 35 U.S.C. 154(b) by 97 days.

This patent is subject to a terminal disclaimer.

(21) Appl. No.: 16/346,364

(22) PCT Filed: Oct. 31, 2017

(86) PCT No.: PCT/SE2017/051069
§ 371 (c)(1),
(2) Date: Apr. 30, 2019

(87) PCT Pub. No.: WO2018/084780
PCT Pub. Date: May 11, 2018

(65) Prior Publication Data
US 2020/0194985 A1    Jun. 18, 2020

(30) Foreign Application Priority Data
Nov. 3, 2016 (SE) .................... 1651449-9

(51) Int. Cl.
*F16L 5/08* (2006.01)
*F16L 5/14* (2006.01)
(Continued)

(52) U.S. Cl.
CPC ............... *H02G 3/22* (2013.01); *F16L 5/08* (2013.01); *F16L 5/14* (2013.01); *H02G 3/088* (2013.01)

(58) Field of Classification Search
CPC . F16L 15/00; F16L 15/08; F16L 15/14; F16L 15/02; H02G 3/22; H02G 3/00;
(Continued)

(56) References Cited

U.S. PATENT DOCUMENTS 3,282,544 A * 11/1966 Brattberg ................ H02G 3/22
248/56
3,976,825 A * 8/1976 Anderberg ............... H02G 3/22
174/151

(Continued)

FOREIGN PATENT DOCUMENTS

AU    2006346395    1/2008
CN    1160438 A    9/1997
(Continued)

OTHER PUBLICATIONS

Chinese Office Action for CN Application No. 201780067446.8 dated Mar. 16, 2020 including English Translation (19 pages).
(Continued)

*Primary Examiner* — Nathan Cumar
(74) *Attorney, Agent, or Firm* — Merchant & Gould P.C.

(57) ABSTRACT

The present invention concerns a wedge for a lead-through system. The wedge comprises a first wedge element, a second wedge element, a third wedge element and a fourth wedge element. The first and second wedge elements are arranged moveable towards and away from each other. The third and fourth wedge elements are placed on opposite sides of the first and second wedge elements, abutting the first and second wedge elements along sloping surfaces. The wedge elements and the sloping surfaces are so arranged that the third and fourth wedge elements will be moved away from each other when the first and second wedge elements are moved toward each other and that the third and fourth wedge elements are moved toward each other when the first and second wedge elements are moved away from each other. The wedge further comprises a bracket on the outside of the first wedge element. The bracket receives a socket arranged to be able to rotate in relation to the bracket. A compression screw is connected with one end to the second wedge (Continued)

element and goes through an opening of the first wedge element. A head of the compression screw is received inside the socket of the bracket.

12 Claims, 3 Drawing Sheets

(51) Int. Cl.
   *H02G 3/22* (2006.01)
   *H02G 3/08* (2006.01)
(58) Field of Classification Search
   CPC .......... H02G 3/08; H02G 3/081; H02G 3/083; H02G 3/086; H02G 3/088
   USPC ........................................................ 277/628
   See application file for complete search history.

(56) References Cited

U.S. PATENT DOCUMENTS 4,376,230 A * 3/1983 Bargsten .................. H02G 3/22
   174/505
   5,938,152 A * 8/1999 Kreutz ...................... F16L 5/08
   174/656
   10,371,182 B2 * 8/2019 Milton ...................... F16B 2/14
   10,655,659 B2 * 5/2020 Milton ...................... H02G 3/22

FOREIGN PATENT DOCUMENTS

| CN | 1914447 A | 2/2007 |
   |----|-----------|--------|
   | CN | 101068073 A | 11/2007 |
   | CN | 101495792 A | 7/2009 |
   | CN | 203384188 U | 1/2014 |
   | CN | 203500203 U | 3/2014 |
   | CN | 105840611 A | 8/2016 |
   | CN | 205565614 U | 9/2016 |
   | KR | 20100090583 A | 8/2010 |
   | KR | 101014761 B1 | 2/2011 |
   | WO | WO 96/11353 A1 | 4/1996 |
   | WO | WO 2008/010755 A1 | 1/2008 |

OTHER PUBLICATIONS

International Search Report and Written Opinion for PCT/SE2017/051069, dated Dec. 21, 2017.
   Brandschutztechnik Döpfl GmbH:'Multi Cable Transit, Modular System', Product Catalogue, version 2.2e, Nov. 2010.

* cited by examiner

WEDGE FOR A LEAD-THROUGH SYSTEM

This application is a National Stage Application of PCT/SE2017/051069, filed 31 Oct. 2017, which claims the benefit of priority to Swedish Patent Application No. 1651449-9, filed 3 Nov. 2016, which applications are incorporated herein by reference. To the extent appropriate, a claim of priority is made to each of the above disclosed applications.

TECHNICAL FIELD

The present invention concerns a wedge for a lead-through system, which wedge is moveable between a non-compressing state and a compressing state

PRIOR ART

The present invention is mainly intended for a lead-through system comprising a frame, a number of modules, stay plates and a wedge. The modules, stay plates and the wedge are placed inside the frame. The modules are made of a compressible material and each module is to receive a cable, pipe or wire. The function of the stay plates is to hinder the modules from going out of the frame in use. The wedge is a compression means which is to compress the modules in order for each module to seal inwardly against the cable, pipe or wire and outwardly against other modules, stay plates and/or the frame.

Lead-through systems of this kind are used in many different environments, such as for cabinets, technical shelters, junction boxes and machines and also decks and bulkheads of ships. They are used in different industrial environments, such as automotive, telecom, power generation and distribution as well as marine and offshore. They may have to seal against fluid, gas, fire, rodents, termites, dust moisture etc.

In one wedge according to prior art (WO 96/11353) the wedge is moved between a non-compressing state and a compressing state by means of two screws, whereby each screw has threads with opposite pitches. The screws are connected to two wedge elements, which are moved towards each other if the screws are turned in a first direction and away from each other if the screws are turned in the opposite direction. The threads of the screws are in mesh with threads of sleeves inside the wedge elements, whereby the threads of the sleeve of one of the wedge elements are in mesh with threads of a first pitch of the screws and the threads of the sleeve of the other wedge element are in mesh with threads of an opposite pitch of the screws. Two further wedge elements are placed on sloping surfaces on opposite sides of the two first wedge elements, whereby the two further wedge elements will be moved toward and away from each other depending on the movement of the two first wedge elements. When the two further wedge elements are moved away from each other the thickness of the wedge increases, giving a compression force when placed inside the frame.

To move the wedge between the non-compressing state and the compressing state, both screws have to be turned and it is normally done alternately. If the screws are not turned alternately it is a risk that the wedge elements connected to the screws will become skewed and possibly lock further movements of the wedge elements. In lead-through systems of this kind it is vital that the compression force given by the wedge amount to a predetermined value. If the compression force is below said predetermined value there is a clear risk of not having a tight seal. In the wedge of prior art the compression force is given when the screws are screwed out, whereby the distance between the screw heads and the wedge increases. Said distance is an indication of the applied compression force. Thus, the predetermined force is reached when the distance between the screw heads and the wedge amounts to a certain value. To establish that enough compression force has been applied said distance has to be measured. Such measuring is often cumbersome.

SUMMARY

In view of the above, one object of the present invention is to provide a wedge for a lead-through system, which wedge is more easy to handle regarding activation and deactivation of the wedge. Furthermore, it is beneficial if it is easier to accomplish the desired compression force and to establish whether the desired compression force has been achieved.

According to one aspect of the present invention a wedge is provided, comprising four wedge elements. A first wedge element and a second wedge element are arranged moveable towards and away from each other. A third wedge element and a fourth wedge element are placed on opposite sides of the first and second wedge elements abutting the first and second wedge elements along sloping surfaces. The wedge elements and the sloping surfaces are so arranged that the third and fourth wedge elements will be moved away from each other when the first and second wedge elements are moved toward each other and that the third and fourth wedge elements are moved toward each other when the first and second wedge elements are moved away from each other. The wedge further comprises a bracket on the outside of the first wedge element. The bracket receives a socket arranged to be able to rotate in relation to the bracket. A compression screw is connected with one end to the second wedge element and goes through an opening of the first wedge element. A head of the compression screw is received inside the socket of the bracket.

Further objects and advantages of the present invention will be obvious to a person skilled in the art reading the detailed description below of at present preferred embodiments.

BRIEF DESCRIPTION OF THE DRAWINGS

The present invention will be described further below by way of example and with reference to the enclosed drawings. In the drawings.

DETAILED DESCRIPTION OF EMBODIMENTS

As used in this description the terms "longitudinal", "transversal", and the like are in relation to the compression screw of the wedge.

Figure 1:
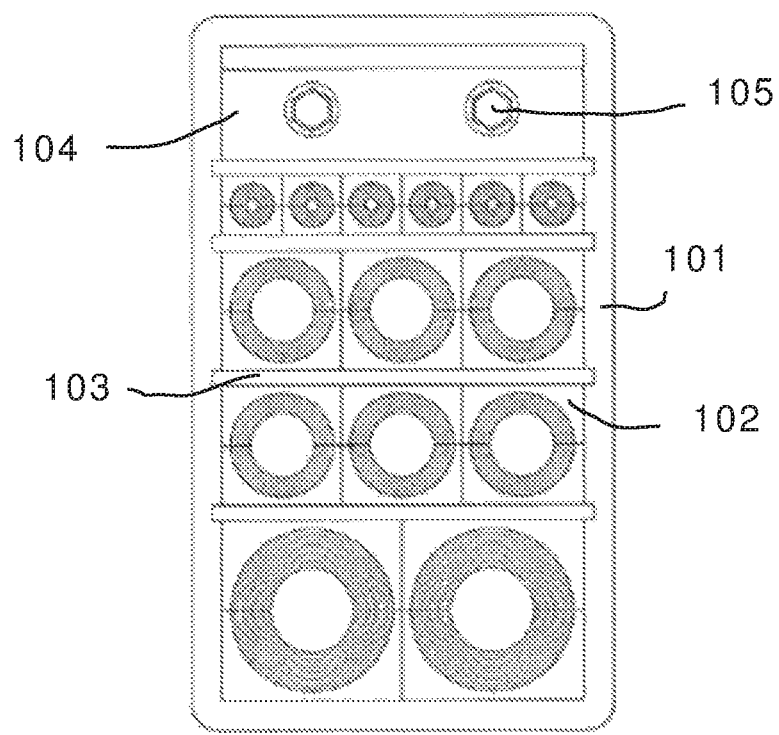
FIG. 1 is a front view of a lead-through system of the prior art, in which the wedge of the present invention may be used.

The wedge of the present invention is intended for use in a lead-through system as exemplified in FIG. 1. The exact form of the different parts of the lead-through system may vary. In the shown embodiment according to the prior art, a frame 101 receives a number of modules 102. The frame 101 is to be placed in a transition, such as a wall, roof or floor, and each module 102 is to receive a cable, wire or pipe. To assist in holding the modules 102 in place inside the frame 101 a number of stay plates 103 are arranged between each row of modules 102 inside the frame 101. The stay plates 103 are arranged moveable in longitudinal direction inside the frame 101, i.e. up and down as shown in FIG. 1. A wedge 104 according to prior art is placed at one inner end of the frame 101, with a stay plate 103 between the wedge 104 and the adjacent row of modules 102. The prior art wedge 104 is a compression unit and by means of screws 105 the wedge 104 can be expanded inside the frame 101. The expansion of the wedge 104 will act on the modules 102 inside the frame 101, whereby the modules 102 will be pressed against each other, against the stay plates 103, against the inner sides of the frame 101 and/or against any cable etc. received inside a module 102, depending on the placement of respective module 102.

The wedge of the present invention is to replace the prior art wedge in a lead-through system, such as the one shown in FIG. 1. The wedge of the present invention comprises a first wedge element 1, a second wedge element 2, a third wedge element 3 and a fourth wedge element 4. The wedge elements 1-4 are made of a rubber or plastic material. The wedge further comprises a compression screw 7, a bracket 5 and a socket 6. The third and fourth wedge elements 3, 4 are moved towards and away form each other in co-action with the first and second wedge elements 1, 2. A front fitting 11 is embedded in the rubber or plastic material of the first wedge element 1 and a rear fitting 12 is embedded in the rubber or plastic material of the second wedge element 2.

The compression screw 7 is received in two sleeves 8, 9. A first sleeve 8 is received in the first element 1 and is fixed to the front fitting 11. A second sleeve 9 is received in the second wedge element 2 and is fixed to the rear fitting 12. The stem of the compression screw 7 goes through the first sleeve 8. The end of the compression screw 7 is received inside the second sleeve 9. The front and rear fittings 11, 12 are normally made of metal, such as steel. The front and rear fittings 11, 12 each has a U-shaped cross section, with the bottom of the U directed towards the outside of the first and second wedge elements 1, 2, respectively. Each fitting 11, 12 extends transversally along about all of respective wedge element 1, 2. The compression screw 7 has a first thread co-acting with a thread of one of the sleeves 8, 9 and a second thread co-acting with a thread of the other sleeve 8, 9. One of the threads of the screw 7 is a right-hand thread while the other thread is a left-hand thread. Depending on the direction of rotation of the compression screw 7 the first and second wedge elements 1, 2 will move towards or away from each other.

The bracket 5 is fixed to the front fitting 11 by means of screws 13. A person skilled in the art realizes that the bracket 5 may be fixed in other ways, such as by snap-in fasteners or by an adhesive. The socket 6 is received in the bracket 5. In the shown embodiment the socket 6 is placed in the bracket 5 by lifting a detachable part 14 of the bracket 5. The socket 6 has a circumferential groove 16, placed between a cylindrical part 15 and a head 17 of the socket 6. The bracket 5 together with the detachable part 14 of the bracket 5 forms a ring protruding inwardly and which ring is to be received in the circumferential groove 16 of the socket 6. To place the socket 6 in the bracket 5 the detachable part 14 of the bracket 5 is first lifted and then the socket 6 is pushed down into the gap formed after lifting the detachable part 14 of the bracket 5. The socket 6 is pushed down into the bracket 5 in such a way that the part of the ring in the bracket 5 will be received inside the circumferential groove 16 of the socket 6. The detachable part 14 of the bracket 5 is then placed in the bracket 5, whereby the part of the ring in the detachable part 14 of the bracket 5 will be placed in the circumferential groove 16 of the socket 6. The relationship between the circumferential groove 16 of the socket 6 and the ring of the bracket 5 is such that the socket 6 is hindered to move longitudinally in relation to the bracket 5 but is free to rotate in relation to the bracket 5. The bracket 5 is made of a suitable material, such as plastic or aluminum.

The detachable part 14 of the bracket 5 is to be slid down in place in the bracket 5 from one side of the bracket 5, by means of co-operating grooves and protruding parts of the detachable part 14 of the bracket 5 and the bracket 5

The compression screw 7 is received in a through opening of the first wedge element 1. It is also received in a through opening of the socket 6. The head 10 of the compression screw 7 is received inside the head 17 of the socket 6 in such a way that it may move longitudinally in relation to the socket 6 but not rotate in relation to the socket 6. The head 17 of the socket 6, protruding outside the bracket 5, has an inner opening with a hexagonal cross section adapted to the form of the head of the compression screw 7. Other forms of the inner opening of the head 17 of the socket 6 and the head 10 of the compression screw 7 are possible. However said forms should be adapted to each other in such a way that the head 10 of the compression screw 7 should be hindered from rotating but be able to move longitudinally in relation to the socket 6. The through opening of the socket 6 has a circular cross section form in the area of the cylindrical part 15 and the groove 16. An edge is thereby formed in the through opening of the socket 6 between the part with circular cross section and the part with hexagonal cross section, which edge restricts longitudinal movement of the head 10 of the compression screw 7 inwardly. The edge between the cylindrical and hexagonal parts of the through opening of the socket 6 gives a distinct stop for the head 10 of the compression screw 7. The compression screw 7 is rotated by rotating the socket 6, for instance by use of a spanner. The inner end of the compression screw 7 is received in the sleeve 9 fixed to the rear fitting 12.

As the sleeves 8, 9 are fixed to the front fitting 11 of the first wedge element 1 and the rear fitting 12 of the second wedge element 2, respectively, the first and second wedge elements 1, 2 will be moved towards or away from each other when the compression screw 7 is rotated. Whether the first and second wedge elements 1, 2 are moved towards or away from each other depend on in which direction the socket 6 and thereby the compression screw 7 is rotated. The directions of the pitches of the compressing screw 7 are such that by screwing the compression screw 7 outwardly the wedge will go towards the compressing state.

The first and second wedge elements 1, 2 are arranged in line with each other and are moveable towards and away from each other. The third and fourth wedge elements 3, 4 are placed above each other and are moveable towards and away from each other. The third and fourth wedge elements 3, 4 are placed between the first and second wedge elements 1, 2. The first wedge element 1 abuts the third wedge element 3 and the fourth wedge element 4 along sloping surfaces. The second wedge element 2 abuts the third wedge element 3 and the fourth wedge element 4 along sloping surfaces. The wedge elements 1, 2, 3, 4 and their co-operating sloping surfaces are arranged in such a way that when the first wedge element 1 and the second wedge element 2 are moved toward each other the third wedge element 3 and the fourth wedge element 4 are moved away from each other. Correspondingly, when the first wedge element 1 and the second wedge element 2 are moved away from each other the third wedge element 3 and the fourth wedge element 4 are moved toward each other.

Figure 2:
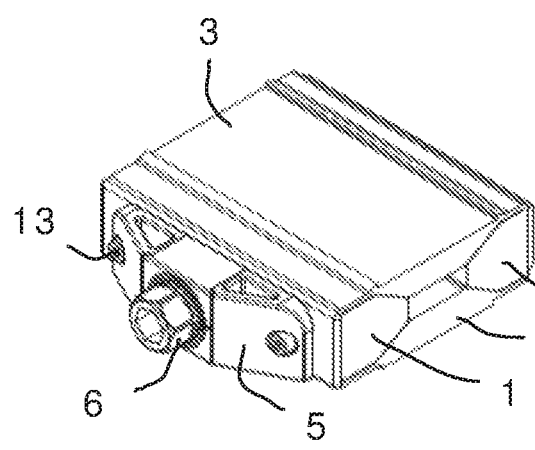
FIG. 2 is a perspective view of one embodiment of a wedge according to the present invention in a non-compressing state.
Figure 3:
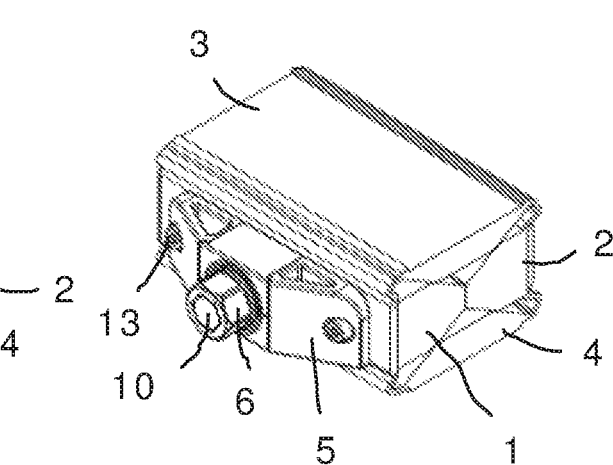
FIG. 3 is a perspective view of the wedge of FIG. 2 in a compressing state.
Figure 4:
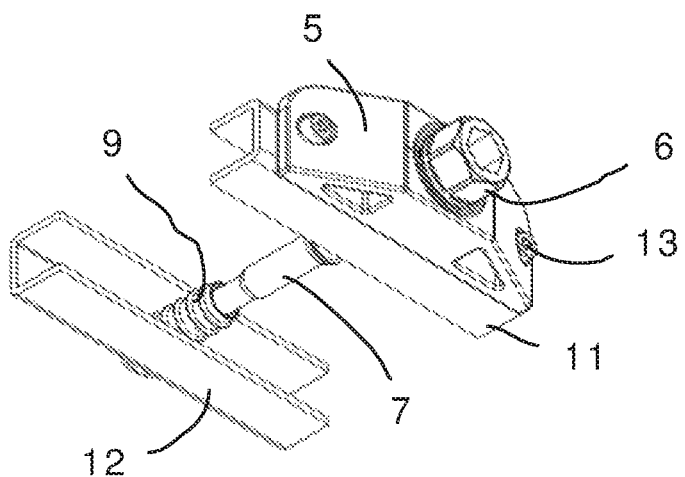
FIG. 4 is a perspective view of parts of the wedge of FIGS. 2 and 3.
Figure 5:
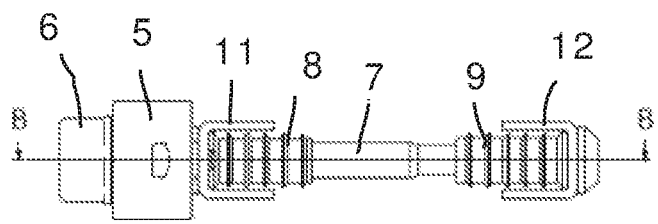
FIG. 5 is a side view of the parts of FIG. 4.
Figure 6:
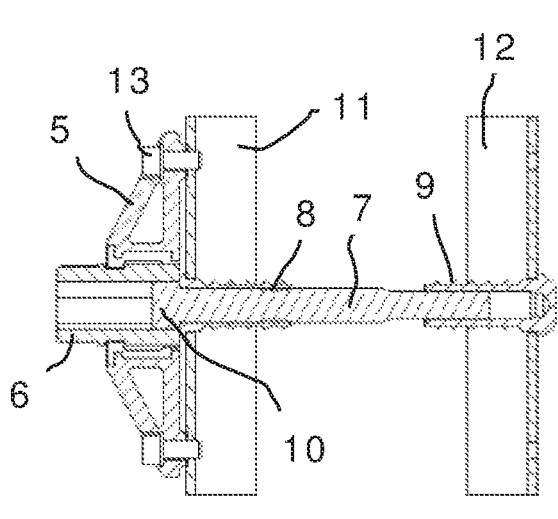
FIG. 6 is a cross section view taken along the line B-B in FIG. 5 and with the parts in a non-compressing state.
Figure 7:
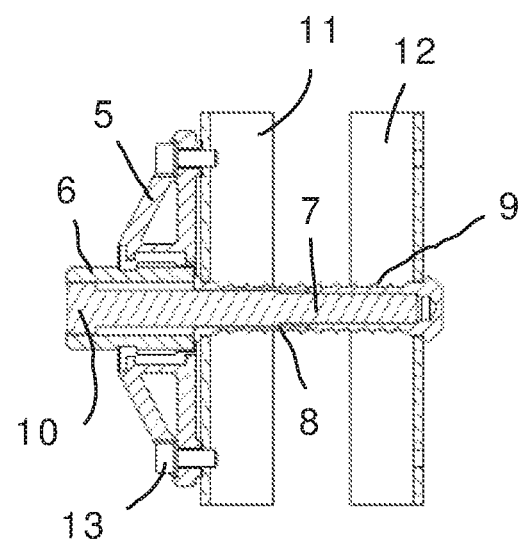
FIG. 7 is a cross section view corresponding with FIG. 6 but with the parts in a compressing state.
Figure 8:
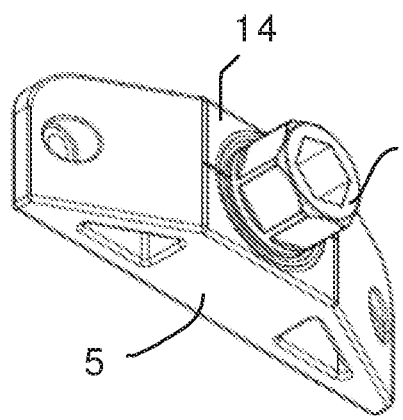
FIG. 8 is a perspective view of a bracket of the wedge of FIG. 2.
Figure 9:
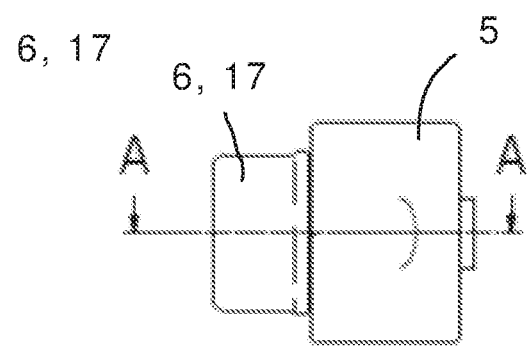
FIG. 9 is a side view of the bracket of FIG. 8.
Figure 10:
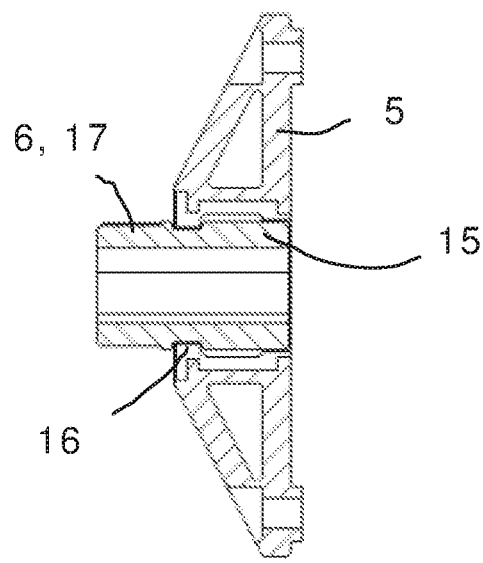
FIG. 10 is a cross section view taken along the line A-A in FIG. 9.

In use the wedge is moveable between two extremes. In a first extreme, as shown in FIG. 2, an upper surface of the third wedge element 3 is about flush with an upper surface of the first wedge element 1 and an upper surface of the second wedge element 2 and a lower surface of the fourth wedge element 4 is about flush with a lower surface of the first wedge element 1 and a lower surface of the second wedge element 2. This first extreme of the wedge could be called a non-compressing state or a flattened out position, as the wedge is as thin as it gets in that position. In a second extreme, as shown in FIG. 3, the first and second wedge elements 1, 2 are moved as close to each other as they can be moved, whereby the third and fourth wedge elements 3, 4 are moved as far apart from each other as they can be moved. In said second extreme the first and second wedge elements 1, 2 will normally abut each other, giving a distinct stop. In the second extreme the wedge is as thick as it gets. The second extreme could be called a full compressing state. The wedge may assume any position between the extremes, but in use it is normally placed in one of said extremes. It is placed in the first extreme for insertion into the frame and in the second extreme in order to give the predetermined compression inside the frame.

In the compressing state of the wedge, corresponding with the second extreme as shown in FIG. 3, the outer end of the head 10 of the compression screw 7 is to be flush with the outer end of the head 17 of the socket 6. When the outer end of the head 10 of the compression screw 7 is flush with the outer end of the head 17 of the socket 6, the desired compression force is achieved. Thus, this gives an indication of appropriate compression, which indication is both visual and tactile.

The invention claimed is:

1. A wedge for a lead-through system, wherein the wedge comprises a first wedge element, a second wedge element, a third wedge element and a fourth wedge element, wherein the first and second wedge elements are arranged moveable towards and away from each other, wherein the third and fourth wedge elements are placed on opposite sides of the first and second wedge elements and abutting the first and second wedge elements along sloping surfaces, and wherein the wedge elements and the sloping surfaces are so arranged that the third and fourth wedge elements will be moved away from each other when the first and second wedge elements are moved toward each other and that the third and fourth wedge elements are moved toward each other when the first and second wedge elements are moved away from each other, wherein the wedge comprises a bracket on an outside of the first wedge element, the bracket receives a socket arranged to rotate in relation to the bracket, wherein a compression screw is connected with one end to the second wedge element and goes through an opening of the first wedge element and a head of the compression screw is received inside the socket of the bracket, and wherein the head of the compression screw is hindered from rotating in relation to the socket but is free to move longitudinally in relation to the socket.

2. The wedge of claim 1, wherein the socket is locked from longitudinal movement in relation to the bracket.

3. The wedge of claim 1, wherein the socket has a cylindrical part at one end, a head at the opposite end and an outer circumferential groove placed between the cylindrical part and the head and wherein the socket has an through opening.

4. The wedge of claim 3, wherein the through opening of the socket in the area of the head of the socket has an inner form adapted to the form of the head of the compression screw.

5. The wedge of claim 4, wherein the through opening has a hexagonal form in the area of the head of the socket, corresponding with a hexagonal form of the head of the compression screw.

6. The wedge of claim 5, wherein the through opening of the socket has a circular cross section form in the area of the cylindrical part and the groove of the socket giving an edge inside the through opening between the part having a circular inner cross section form and the part having a hexagonal inner cross section form.

7. The wedge of claim 3, wherein the bracket has a detachable part, the detachable part may be slid into place in or out of the rest of the bracket by means of co-operating grooves and protruding parts, wherein the bracket together with the detachable part forms a circumferential ring projecting inwardly, wherein the socket is placed in the bracket and wherein the circumferential ring projects into the outer circumferential groove of the socket.

8. The wedge of claim 1, wherein a first sleeve is received in the first wedge element and a second sleeve is received in the second wedge element, wherein the compression screw have threads with opposite pitch, each co-operating with inner threads of one of the sleeves in such a way that depending on the direction of rotation of the compression screw the first and second wedge elements are moved towards or away from each other.

9. The wedge of claim 8, wherein a front fitting is received in the first wedge element and a rear fitting is received in the second wedge element, wherein the first and second sleeves are fastened to the front fitting and rear fitting, respectively.

10. The wedge of claim 9, wherein the bracket is fixed to the front fitting by means of screws, snap-in fasteners or an adhesive.

11. The wedge of claim 3, wherein in a full compressing state of the wedge, the outer end of the head of the compression screw is flush with the outer end of the head of the socket.

12. The wedge of claim 1, wherein the wedge is placed inside a frame of a lead-through system together with modules and stay plates.

* * * * *